(12) United States Patent
Earl

(10) Patent No.: US 6,461,543 B2
(45) Date of Patent: Oct. 8, 2002

(54) CHEMILUMINESCENT SOLUTION BASED ON DISUBSTITUTED PERYLENE TETRACARBOXYLIC ACIDS, THEIR DIANHYDRIDES AND DIIMIDES

(75) Inventor: Cranor Earl, Longmeadow, MA (US)

(73) Assignee: Omniglow Corporation, West Springfield, MA (US)

( * ) Notice: Subject to any disclaimer, the term of this patent is extended or adjusted under 35 U.S.C. 154(b) by 0 days.

(21) Appl. No.: 09/764,966

(22) Filed: Jan. 17, 2001

(65) Prior Publication Data

US 2002/0093009 A1 Jul. 18, 2002

(51) Int. Cl.$^7$ ................................................ C09K 11/07
(52) U.S. Cl. ................... 252/700; 252/301.16; 549/232
(58) Field of Search ........................... 252/700, 301.16; 549/232

(56) References Cited

U.S. PATENT DOCUMENTS

| | | | |
|---|---|---|---|
| 4,372,745 A | * | 2/1983 | Mandle et al. ............... 252/700 |
| 4,678,608 A | | 7/1987 | Dugliss |
| 5,122,306 A | | 6/1992 | Van Moer et al. |
| 6,063,181 A | * | 5/2000 | Bohm et al. ................ 106/493 |

* cited by examiner

*Primary Examiner*—Robert Dawson
*Assistant Examiner*—Marc S Zimmer
(74) *Attorney, Agent, or Firm*—McHale & Slavin

(57) ABSTRACT

Compositions adapted to be reacted with hydrogen peroxide to provide chemiluminescent light are disclosed wherein the fluorescer is selected from 1,7-disubstituted perylene-3,4,9,10-tetracarboxylic acids, their dianhydrides and diimides.

11 Claims, No Drawings

CHEMILUMINESCENT SOLUTION BASED ON DISUBSTITUTED PERYLENE TETRACARBOXYLIC ACIDS, THEIR DIANHYDRIDES AND DIIMIDES

FIELD OF THE INVENTION

The present invention relates to the production of light by chemiluminescence and, more particularly, the use of specific fluorescent agents for this purpose.

BACKGROUND OF THE INVENTION

The principle and the techniques for the production of chemiluminescent light are described in detail in U.S. Pat. No. 4,678,608 which is incorporated in the present description as a reference.

Chemiluminescence is produced by a reaction in the liquid phase of an activator such as hydrogen peroxide with a fluorescent agent and an oxalate. Optionally, other secondary compounds can be present. In general, they are also fluorescent agents, which modify the characteristics of the emitted light.

Until now, there existed no simple means to produce orange chemiluminescent light which is satisfactory for the users. The prior art mixed yellow and red chemiluminescent light producing solutions to yield an orange colored light. The major drawback of this approach was that the color was blotchy, especially in a narrow environment, e.g. in a chemiluminescent glow necklace. Additionally, the two solutions would sometimes decay at different rates, leading to a shift in coloration with time, e.g. to yellow or red.

U.S. Pat. No. 5,122,306, the contents of which are herein incorporated by reference, discloses a chemiluminescent solution based on substituted perylene for producing a red chemiluminescent light.

There exists a significant demand for orange chemiluminescent light. Orange is a color which is greatly appreciated by the public at large and the ability to produce a pleasing orange coloration via a chemiluminescent composition would be highly desirable.

SUMMARY OF THE INVENTION

It has now been observed unexpectedly that known fluorescent dyes which are soluble in organic solvents and, particularly, disubstituted perylene tetracarboxylic acids, their dianhydrides and diiimides, can be used advantageously to produce a chemiluminescent light, particularly an orange chemiluminescent light, which is particularly appreciated by the users and which differs from the colors produced in the prior art.

Accordingly, it is an objective of the instant invention to teach a composition adapted to be reacted with hydrogen peroxide to provide orange chemiluminescent light.

It is a further objective of the instant invention to teach a composition for providing chemiluminescent light wherein the fluorescer is selected from 1,7-disubstituted perylene-3,4,9,10-tetracarboxylic acids, their dianhydrides and diimides.

Other objects and advantages of this invention will become apparent from the following description taken in conjunction with the accompanying drawings wherein are set forth, by way of illustration and example, certain embodiments of this invention.

DETAILED DESCRIPTION OF THE INVENTION

The present invention relates to a composition adapted to be reacted with hydrogen peroxide to provide chemiluminescent light, said composition containing a 1,7, disubstituted perylene-3,4,9,10-tetracarboxylic dianhydride compound having the general formula:

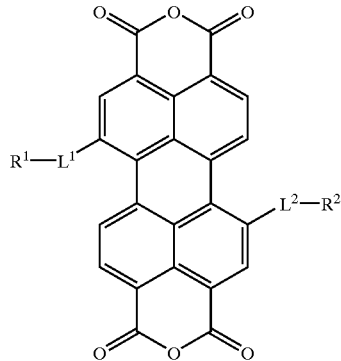

wherein
$L^1$, $L^2$ independently of each other are 1,2-ethylene, 1,2-ethenylene or 1,2-ethynylene;
$R^1$, $R^2$ independently of each other are hydrogen or $C_1$–$C_{30}$-alkyl, whose carbon atom chain optionally is interrupted by at least one moiety selected from the group consisting of —O—, —S—, —$NR^3$—, —CO— and —$SO_2$— and/or which is optionally substituted once by a moiety selected from the group consisting of —$COOR^3$, —$SO_3R^3$, cyano or a 5- to 7-membered heterocyclic radical which is attached via a nitrogen atom and which optionally contains one additional nitrogen atom, oxygen atom or sulfur atom and which is optionally aromatic; or substituted one or two times by hydroxyl, $C_1$–$C_5$-alkoxy, $C_5$–$C_8$-cycloalkyl or aryl, $R^3$ being hydrogen or $C_1$–$C_6$-alkyl, the amount of said compound being such as to provide visible light.

Specific embodiments include compositions wherein $L^1$, $L^2$ are identical and are 1,2-ethenylene or 1,2-ethynylene and $R^1$, $R^2$ independently of one another are hydrogen or $C_1$–$C_{18}$-alkyl which can be substituted by —$COOR^3$, hydroxyl or cyano. Additionally, specific heterocyclic radicals are 4-morpholinyl, 1-pyrrolidinyl, 1-piperidyl or 4-piperidyl.

The above-mentioned compounds, their related tetracarboxylic acids, and the diimides of said acids are described in PCT/EP96/05525 filed Dec. 11, 1996, now WO 97/22608, published Jun. 26, 1997 and U.S. Pat. No. 6,063,181, issued May 16, 2000, the contents of which are herein incorporated by reference. These patents also describe the preparation of analog derivatives. The preferred compound is sold under the trade name LUMOGEN PINK ED2222, and is known to be useful as a fluorescent dye For producing a pink light reflecting surface when compounded into various polymers. It has now been discovered that LUMOGEN PINK ED2222 will emit a true orange light, e.g. 580–585 nm, when utilized as a fluorescer composition in chemiluminescent light producing solutions.

To produce chemiluminescent light, the compounds according to the present invention are used under the conditions already described in the literature, particularly in said U.S. Pat. No. 4,678,608. In general, one can use any known solvent or oxalate which can be used for the production of chemiluminescent light. The solvent can be an ester, aromatic derivatives or a chlorinated hydrocarbon. Preferably, phthalates are used, in particular dibutyl phthalate.

Oxalates, such as those described in U.S. Pat. Nos. 3,749,679 and 3,846,316, incorporated herein by reference, may be used to produce the chemical reaction to cause chemiluminescent light when mixed with the fluorescers described above, with bis (2,4,5-trichloro-6-carbopentoxylphenyl) oxalate being exemplary.

Substituted carbalkoxyphenyl oxalate are the preferred class of oxalates used herein the oxalate and perylene fluorescer each being used in sufficient quantity to cause chemiluminescent light, preferably in a 20–40:1 oxalate to fluorescer, molar ratio.

Useful catalysts are disclosed in U.S. Pat. No. 3,775,336, incorporated herein by reference, in concentrations disclosed therein, and usually in the solvent solution of the hydrogen peroxide.

The areas of application are well known and they include the production of useful objects, particularly signs, decorative objects, games and gadgets such as chemiluminescent necklaces, etc. In such articles, the chemiluminescent light is produced by mixing a solution of an activator, in general oxygenated water (hydrogen peroxide), with a solution which contains the derivatives of disubstituted perylene and an oxalate diester. The article consists of, in its passive state, two compartments between which a communicating link was established at the time of use, for example as described in French Pat. No. 87 11296, for the case of flexible luminescent tubes.

The following example will illustrate the invention without limiting it.

EXAMPLE 1

Prepare an Activator solution containing approximately 85 weight percent Dimethyl Phthalate, 10 weight percent t-Butanol, and 5 weight percent 70% hydrogen peroxide (as is). Catalyze with 0.0085 weight percent Sodium Salicylate.

Prepare an Oxalate solution with 86 weight percent Butyl Benzoate, 13.9 weight percent CPPO, and 0.1 weight percent LUMOGEN PINK ED2222.

Mix equal parts of the oxalate and activator solution. A strong orange colored light will be produced as the two are mixed, with a color exhibiting a wavelength of approximately 585 nm.

EXAMPLE 2

Prepare the activator solution as in Example 1.

Prepare an Oxalate solution as in Example 1 but increase the quantity of LUMOGEN PINK ED2222 from 0.1 weight percent to 0.5 weight percent.

Again mix equal parts of the oxalate and activator solutions. A strong orange-red colored light will be produced as the two are mixed, with a color exhibiting a wavelength of approximately 600 nm.

EXAMPLE 3

Prepare the activator solution as in Example 1.

Prepare an Oxalate solution as in Example 1 but increase the quantity of LUMOGEN PINK ED2222 from 0.1 weight percent to 1.0 weight percent.

Again mix equal parts of the oxalate and activator solutions. A strong red colored light will be produced as the two are mixed, with a color exhibiting a wavelength of approximately 610 nm.

EXAMPLE 4

Prepare an Oxalate solution with 85 weight percent Butyl Benzoate, 13.9 weight percent CPPO, and 1.0 weight percent LUMOGEN PINK ED2222.

Prepare an Oxalate solution with 85 weight percent Butyl Benzoate, 13.9 weight percent CPPO, and 1.0 weight percent CBPEA.

Store both at 20 F. for 24 hours. The CBPEA will crystallize out of solution.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

What is claimed is:

1. A composition which is reacted with hydrogen peroxide to provide chemiluminescent light, said composition including an oxalate compound, and further containing a 1,7-disubstituted perylene-3,4,9,10-tetracarboxylic dianhydride fluorescer compound having the formula:

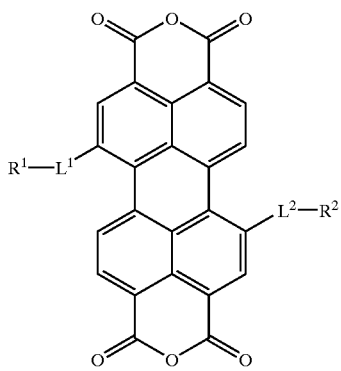

wherein

L$^1$, L$^2$ independently of each other are 1,2-ethylene, 1,2-ethenylene or 1,2-ethynylene;

R$^1$, R$^2$ independently of each other are hydrogen or C$_1$–C$_{30}$-alkyl, whose carbon atom chain optionally is interrupted by at least one moiety selected from the group consisting of —O—, —S—, —NR$^3$—, —CO— and —SO$_2$— and/or which is optionally substituted once by a moiety selected from the group consisting of —COOR$^3$, —SO$_3$R$^3$, cyano or a 5- to 7-membered heterocyclic radical which is attached via a nitrogen atom and which optionally contains one additional nitrogen atom, oxygen atom or sulfur atom and which is optionally aromatic; or substituted one or two times by hydroxyl, C$_1$–C$_5$-alkoxy, C$_6$–C$_8$-cycloalkyl or aryl, R$^3$ being hydrogen or C$_1$–C$_6$-alkyl, the amount of each said compounds being such as to provide visible light.

2. A composition according to claim 1 wherein:

L, L$^2$ are identical and are 1,2-ethenylene or 1,2-ethynylene and

R, R$^2$ independently of one another are hydrogen or C$_1$–C$_{18}$-alkyl which can be substituted by —COOR$^3$, hydroxyl or cyano.

3. A composition according to claim 1 wherein:

said heterocyclic radical is 4-morpholinyl, 1-pyrrolidinyl, 1-piperidyl or 4-piperidyl.

4. A composition according to claim 1 including, in addition thereto, a solvent for said compound.

5. A composition according to claim 1 wherein said oxalate is a substituted carbalkoxyphenyl oxalate.

6. A composition according to claim 5 wherein said oxalate is bis(2,4,5-trichloro-6-carbopentoxylphenyl) oxalate.

7. A composition according to claim 4 wherein said solvent is t-butylphthalate.

8. A composition according to claim 1 wherein said compound is the only fluorescer in the composition.

9. A composition according to claim 1 wherein the chemiluminescent light is orange.

10. A composition according to claim 1 wherein the chemiluminescent light emitted exhibits a wavelength within the range of about 580 nm–610 nm.

11. A method of producing chemiluminescent light which comprises adding to the composition of claim 1 a solution of hydrogen peroxide.

* * * * *